Figure 1:
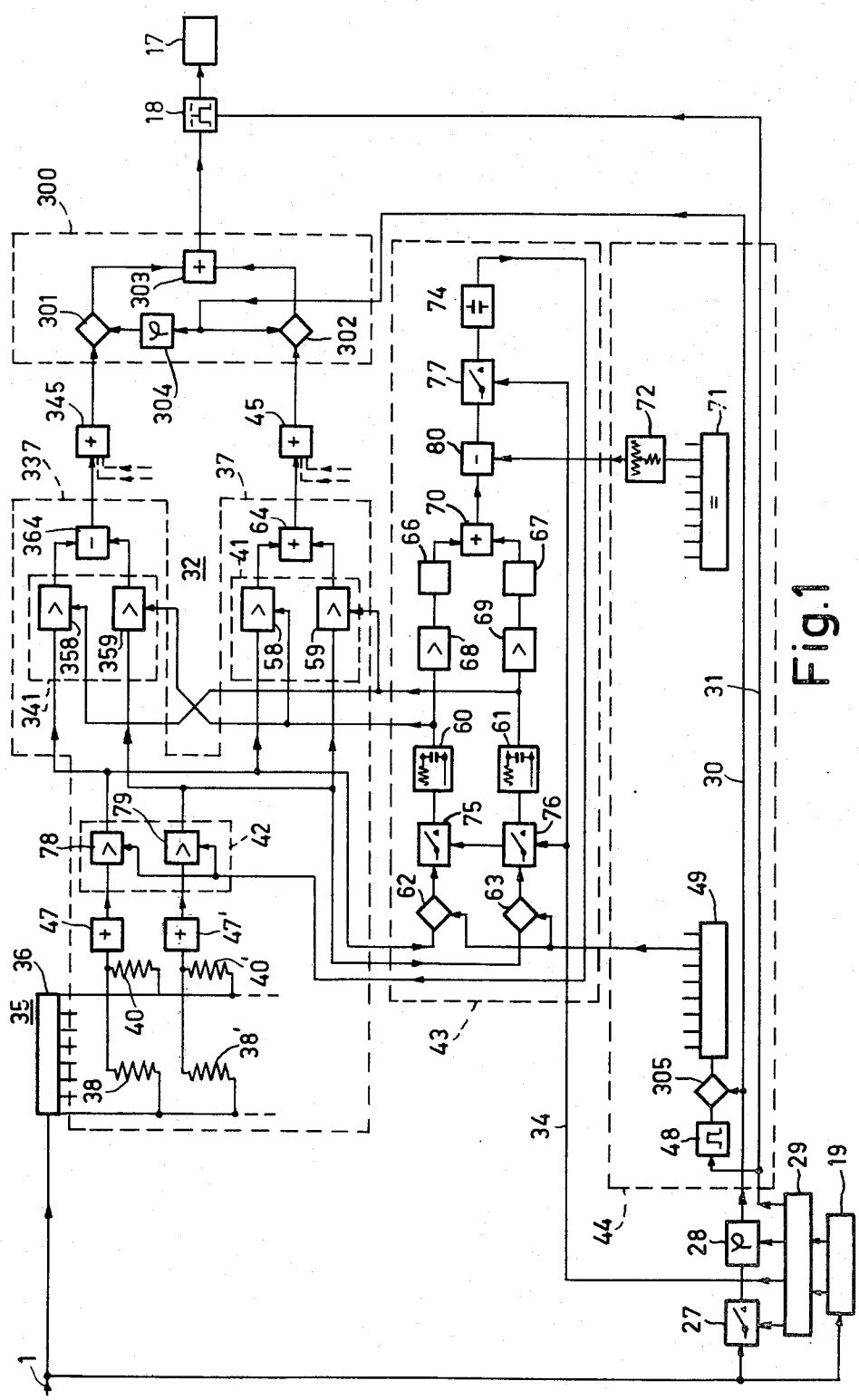

United States Patent [19]
Van Gerwen

[11] 3,990,022
[45] Nov. 2, 1976

[54] SYSTEM FOR AUTOMATIC EQUALIZATION

[75] Inventor: Petrus Josephus Van Gerwen, Eindhoven, Netherlands

[73] Assignee: U.S. Philips Corporation, New York, N.Y.

[22] Filed: Nov. 12, 1975

[21] Appl. No.: 631,387

[30] Foreign Application Priority Data
Dec. 2, 1974   Netherlands .................... 7415664

[52] U.S. Cl. .................................. 333/18; 325/42; 325/323
[51] Int. Cl.$^2$ .......................................... H04B 3/04
[58] Field of Search ................. 333/16, 18; 325/42, 325/50, 323

[56] References Cited
UNITED STATES PATENTS

| | | | |
|---|---|---|---|
| 3,753,115 | 8/1973 | Van Gerwen et al. | 325/42 X |
| 3,845,390 | 10/1974 | De Jager et al. | 333/18 X |
| 3,868,576 | 2/1975 | Bagdasarjanz et al. | 333/18 X |

Primary Examiner—Paul L. Gensler
Attorney, Agent, or Firm—Frank R. Trifari; Simon L. Cohen

[57] ABSTRACT

Utilizing a known equalizer and a single-sideband frequency transposition device, unitary construction is achieved by using a second series of output channels which, by a crosswise connection to the comparators already present in the control voltage generator, supplies a second equalized signal shifted in phase over $\pi/2$ with respect to the equalized output signal of the first series of output channels. The output signals thus formed are used as input signals for a single-sideband frequency transposition device having two modulator stages which are also fed by two frequency transposition oscillations mutually shifted in phase over $\pi/2$. In this way a unitary construction is realized which is especially interesting for integration and which distinguishes itself by an optimum frequency transposition quality as well as by a considerable saving in complex circuit elements.

8 Claims, 3 Drawing Figures

SYSTEM FOR AUTOMATIC EQUALIZATION

The invention relates to a system for automatic equalization of the amplitude-versus-frequency characteristic and the phase-versus-frequency characteristic of a transmission band associated with a transmission path and allotted to the transmission of information signals, the following measures being used in combination in this system:

a. a frequency-analyzer for splitting the transmission band into a number of frequency sub-bands, comprising a delay circuit and a plurality of parallel-arranged output channels each incorporating a sub-bandpass filter and an additional sub-bandpass filter having the same passband but having at least over the passband a mutual phase shift of $\pi/2$, said sub-bandpass filters being formed by connecting each of the output channels via a plurality of weighting networks to points having a different time delay in the delay circuit, the frequency-split frequency sub-bands being derived from the parallel-arranged output channels;

b. the sub-bandpass filters is the output channels of the frequency-analyzer for the frequency components of the information signal jointly form an uninterrupted pass region without reject areas;

c. different output channels of the frequency-analyzer incorporate a phase and amplitude control circuit which are controlled by a control voltage;

d. a control voltage generator for generating the control voltages for controlling the phase and amplitude control circuits incorporated in the output channels of the frequency-analyzer, which control voltage generator comprises a plurality of comparators fed by at least a spectrum component of a received adjusting signal which is split up into its frequency components in the frequency-analyzer and which control voltage generator also comprises a local reference source for the phase and amplitude reference of the adjusting signal split-up into its different frequency components, the control voltage for the different phase and amplitude control circuits being derived from the output of the comparators;

e. an output circuit formed by a first combination device connected to the phase and amplitude control circuits in the output channels of the frequency-analyzer.

An automatic equalization system of this type is described in U.S. Pat. No. 3,845,390 and, as set forth in detail in that specification, important advantages are achieved with such a system, inter alia a minimum acquisition time, a stable operation under all conditions, also in transmission paths of very poor quality, a construction which is suitable for a realization in digital techniques and for integration in a semiconductor body, and a usability for various types of automatic equalization, such as preset and adaptive equalization, having adjusting procedures which respectively preceed and are simultaneously with the data transmission.

An object of the invention is to provide, for the equalization system set forth in the preamble, a new concept of the combination with a single-sideband frequency transposition device, in which combination both an optimum transmission quality and a considerable simplification of the construction is realized, which is especially apparent when designed in digital techniques for integration in a semiconductor body.

The system according to the invention is characterized in that the equalizer, jointly with a single-sideband frequency transposition device constituting a unit, is provided with a second series of output channels connected to the various sub-bandpass filters and additional sub-bandpass filters, said second series of output channels having an output formed by a second combination device, different output channels of said second series incorporating a phase and amplitude control circuit which is crosswise connected to the comparators of the control voltage generator to obtain an output signal from the second combination device which is shifted in phase over $\pi/2$ with respect to the output signal of the first combination device, these combination devices supplying a first and a second input signal for said single-sideband frequency transposition device having a first and a second modulator stage, which are also fed by transposition oscillations which are mutually shifted in phase over $\pi/2$ and which are derived from a common transposition generator, the output signal of the unit constituted by equalizer and single-sideband frequency transposition device being derived from a combination device connected to the output of the two modulator stages.

It is pointed out that the system according to the invention is used for various types of single-sideband modulation, such as single-sideband modulation with fully suppressed second sideband and single-sideband modulation with partly suppressed second sideband.

The invention and its advantages will now be described in detail with reference to the figures.

Figure 2:
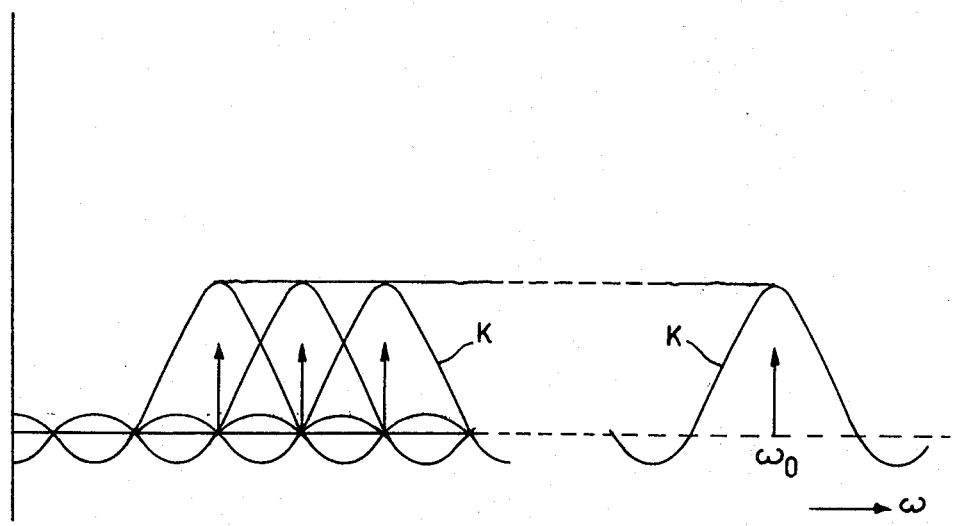
Figure 3:
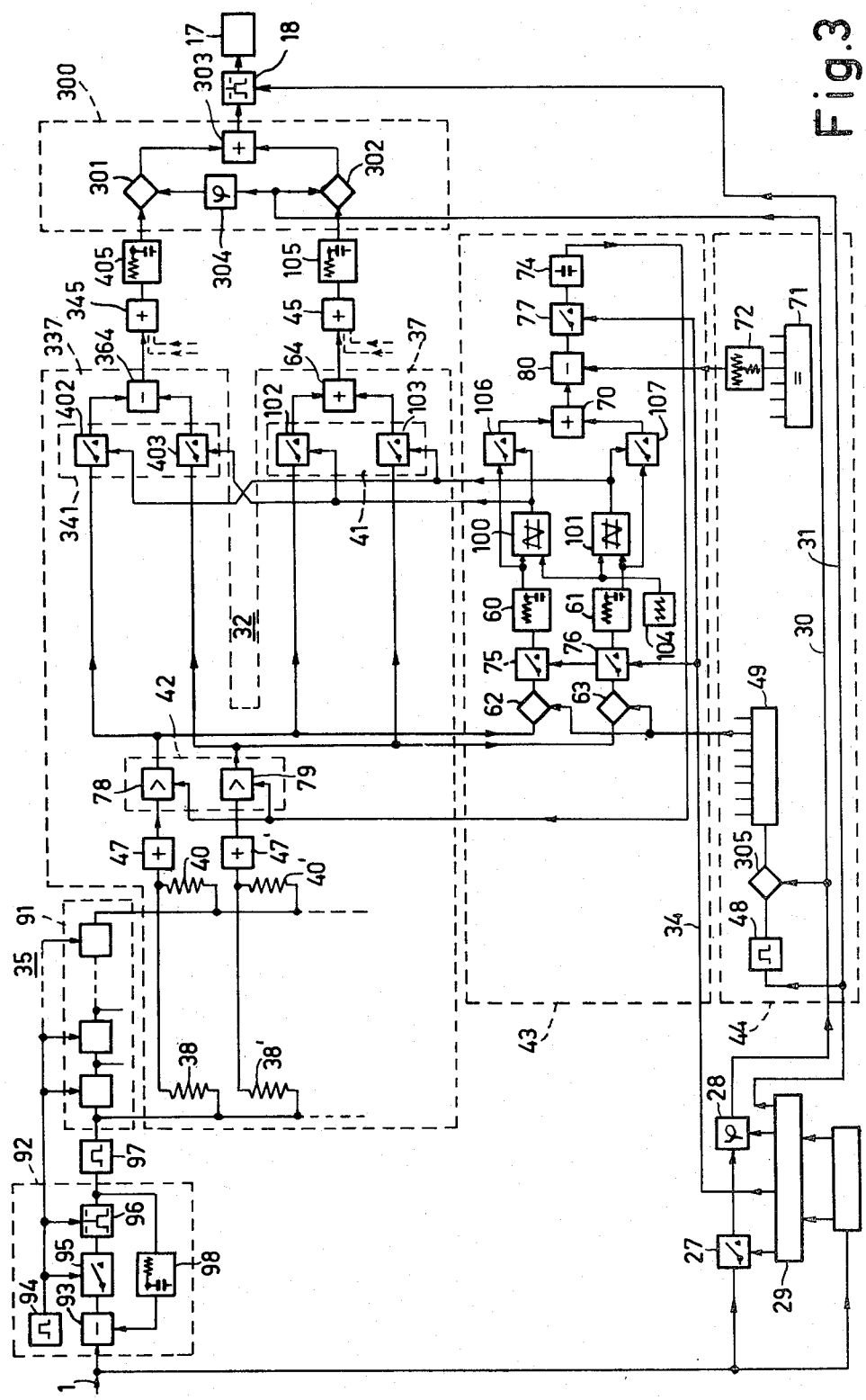

FIG. 1 shows a system according to the invention;
FIG. 2 shows a frequency diagram to explain the system of FIGL 1;
FIG. 3 shows a system according to the invention suitable for implementation in digital techniques for integration to a semiconductor body.

The system according to the invention, shown in FIG. 1 is provided with a preset equalizer according to the above-mentioned patent specification and with a frequency transposition device. This device is included in a receiver for receiving synchronous binary pulse signals at a transmission rate of 3.2 kbit/sec, which are transmitted via a transmission path 1 by means of single-sideband modulation with a partly suppressed carrier of 2.6 kHz in a transmission band of 0.3–3.2 kHz. On either side of the transmission band occupied by the modulated pulse signals, two pilot signals of 0.6 kHz and 3 kHz are transmitted for locally recovering, at the receiver side, the carrier frequency and the clock pulse frequency, which are used respectively for demodulation in a frequency transposition device, designed as a single-sideband demodulator, and for pulse regeneration in a pulse regenerator 18 connected to a signal sink 17.

For generating the local carrier and the local clock pulses the receiver comprises, as is also the case in said patent specification, a central frequency generator 19 controlled by the two pilot signals, to whose output a time distributor 29 is connected which, after it has been actuated by the simultaneous occurrence of the two pilot signals, successively applies the local carrier and the local clock pulses to a carrier lead 30 and a clock frequency lead 31. The carrier lead 30 is provided in known manner with a phase control circuit 28 for correcting the phase of the locally generated carrier according to the phase of the carrier which is transmitted at the beginning of the transmission and which is supplied for a short period of time through a switch 27 to the phase control circuit 28, whose phase is maintained after switch 27 has been opened. Thus, on receipt of the modulated pulse signal the local carrier for single-sideband demodulation and the local clock pulses for pulse regeneration are already available at carrier leads 30 and clock frequency lead 31.

In order to obtain in pulse regeneration 18 an optimum resolution of the binary pulses consisting of 1 and 0 pulses, an automatic equalizer 32 is arranged preceding pulse regeneration 18. According to said patent specification, this equalizer 32 is provided with a frequency-analyzer 35 for splitting the transmission band into a number of frequency sub-bands, which analyzer 35 comprises a delay circuit 36 and a plurality of parallel-arranged output channels 37 having mutually equal structures and incorporating sub-band filters. The sub-band filters in the output channels 37 jointly form an uninterrupted pass region without reject areas for the frequency components of the information signal. Besides the sub-band filters, additional sub-band filters are also incorporated in the output channel 37. Both sub-band filters in an output channel 37 are formed by connecting one end of a number of weighting networks in the form of attenuating networks 38 . . . 40 and 38' . . . 40', respectively, to points of the delay circuit 36 which have a different time delay and by connecting the other end to combination networks 47, 47'. The frequency-split sub-bands are derived from the combination networks 47 and 47', respectively, in the parallel-arranged output channels 37. In the various output channels 37 and sub-band filters 38–40, 47 and the additional sub-band filters 38'–40' 47' show the same passband but, at least over the passband, a constant mutual phase shift of $\pi/2$. By means of a suitable dimensioning of the attenuation network 38–40, 38'–40' it has in particular been realized, in accordance with said patent specification, that the sub-band filters and additional sub-band filters have identical amplitude-versus-frequency characteristics but phase-versus-frequency characteristics which are mutually shifted in phase over $\pi/2$.

For the automatic equalization a phase and amplitude control circuit 41, 42 is included in the various output channels 37 of the frequency-analyzer, and by combining all outputs of the series of output channels 37 in a first combination device 45 the equalized output signal of the equalizer is obtained. In the system shown, the amplitude control circuit 42 in the various output channels 37 is composed of amplitude controllers formed by control amplifiers 78, 79 which are connected to the sub-band filters 38–40, 47 and 38'–40', 47' respectively, and the phase control circuit 41 is composed of subsequent amplitude controllers in the form of control amplifiers 58, 59 of the proportional type, whose output signals supply, after addition in a combination device 64, the output signal, equalized as to phase and amplitude, of the relevant output channel 37 to be combined with the output signals of the remaining output channels 37 in the first combination device 45.

Prior to the information transmission, adjustment of the described preset equalizer is effected by means of a control voltage generator provided with a plurality of comparators 43, notably by the transmission of an adjusting signal derived from a test pulse pattern generator synchronized with the clock frequency and having a repetition period equal to an integral multiple of the clock period. This repetition period is, for example, equal to 16 clock periods so that the frequency components of the adjusting signals are located at mutual frequency distances of 200 Hz, corresponding with the pass regions of the sub-band filters 38–40, 47 and 38'–40', 47' respectively. In this adjusting period, the control voltages for the phase and amplitude control circuits 41, 42 of all output channels 37 are simultaneously generated by comparing in comparators 43 the phase and amplitude of the frequency components of the adjusting signals, split-up in the sub-band pass filter 38–40, 47 and 38'–40', 47' respectively, with the phase and amplitude references of a local reference source 44. For that purpose the local reference source 44 is provided with a local test pulse generator, which is synchronized via clock frequency lead 31 and which corresponds with the test pulse pattern generator at the transmitter side, and a subsequent selection filter 49, which is constructed in the same manner as the frequency-analyzer 35 already described for selecting the various frequency components of the local test pulse pattern which form the phase references. Furthermore, the reference source 44 is provided with a d.c. voltage source 71 with attenuators 72 connected thereto, which, by means of a suitable adjustment supply the amplitude references.

In more detail, each of the comparators 43 is provided with two phase detectors 62, 63 which are connected to the sub-bandpass filters 38–40, 47 and 38'–40', 47' respectively, and to the selection filter 49 for the phase reference. In their output circuit, smoothing filters 60, 61 are included which supply the phase control voltages for the proportional amplifiers 58, 59 of phase control circuit 41. Furthermore, the amplitude control is effected by means of squaring stages 66, 67 which are connected at their input side to the smoothing filters 60, 61 of the phase detectors 62, 63 via separation amplifiers 68, 69 and at their output side to a combination device 70. This combination device 70 is followed by a comparison stage 80 connected to the amplitude reference circuits 71, 72 and by a storage network 74, whose output signal is fed back as a control signal for the control amplifiers 78, 79 in amplitude control circuit 42. In the various output channels 37 an output signal equalized as to phase and amplitude is obtained at the combination device 64 connected to the control amplifiers 58, 59, which equalized output signal is combined with the output signals of the remaining output channels 37 in first combination device 45 for further processing.

If, for example, the above pulse-shaped adjusting signal is supplied to the equalizer and if the non-equalized frequency components $a_m \cos(\omega_m t + \phi_m)$ and $a_m \sin(\omega_m t + \phi_m)$ respectively are derived from the sub-bandpass filter 38–40, 47 and the additional sub-bandpass filter 38'–40 ', 47' of the output channel 37 shown in the figure, then the output signal $b_m \cos\omega_m t$ equalized as the phase and amplitude will be produced at the combination device 64 by the operation of the amplitude and phase control circuit 42, 41, $\cos\omega_m t$ and $b_m$ respectively being the phase and amplitude reference value of the local reference source 44.

With these phase- and amplitude reference values the control amplifiers 78, 79 connected to the said bandpass filters 38–40, 47 and 38'–40', 47' respectively supply the signals $\sqrt{b_m} \cos(\omega_m t + \phi_m)$ and $\sqrt{b_m} \sin(\omega_m t + \phi_m)$ in the amplitude control circuit 42. After having been compared with the phase reference, these signals produce at the smoothing filters 60, 61 of phase detectors 62, 63 in comparator 43 the control voltages $\sqrt{b_m}$ cos $\phi_m$ and $\sqrt{b_m}$ sin $\phi_m$ respectively, from which the signal $b_m$ is formed in the combination device 70 after squaring in the squaring stages 66, 67. This signal is compared with the amplitude reference $b_m$ in comparison stage 80 and supplies the control signal which adjusts the amplitude of the output signal of the control amplifiers 78, 79 to the abovementioned value $\sqrt{b_m}$ by feedback.

It is namely a property of the described amplitude control loop that the signal (given by the square of the amplitude of the signal value produced at the output of control amplifiers 78, 79) supplied to comparator stage 80 via combination device 70 is made equal to the amplitude reference $b_m$ of d.c. voltage source 71 with attenuator 72. If, for example, the square of the amplitude of the signal value at the output of control amplifiers 78, 79 increases, this causes the amplitude control voltage to increase also, resulting in a decrease in amplification of control amplifiers 78, 79, and in the opposite case, when the square of the amplitude of the signal value at the outputs of control amplifiers 78, 79 decreases, their amplification will increase.

On the other hand the output signals $\sqrt{b_m}\cos(\omega_m t + \phi_m)$ and $\sqrt{b_m}\sin(\omega_m t + \phi_m)$ respectively of control amplifiers 78, 79 in amplitude control circuit 42 are supplied for phase control to proportional amplifiers 58, 59 of phase control circuit 41 which are at the same time controlled by the phase control voltages $\sqrt{b_m}$ cos $\phi_m$ and $\sqrt{b_m}$ sin $\phi_m$ respectively from smoothing filters 60, 61 of phase detectors 62, 63, thus causing the following output signal to occur at the output of combination device 64:

$$\sqrt{b_m}\cos(\omega_m t + \phi_m) \times \sqrt{b_m}\cos\phi_m + \sqrt{b_m}\sin(\omega_m t + \phi_m) \times \sqrt{b_m}\sin\phi_m = b_m \cos\omega_m t$$

This formula shows the output signal equalized as to phase and amplitude. In exactly the same way the correct phase and amplitude adjustment takes place in the remaining output channels 37, whose output signals are combined in first combination device 45 with the output signal considered above.

During the information transmission after the adjustment period, the adjustment of the equalizer is maintained by means of electronic switches 75, 76 connected between phase detectors 62, 63 and smoothing filters 60, 61 acting as storage networks, and by means of an electronic switch 77 between amplitude comparison stage 80 and storage capacitor 74, the electronic switches 75, 76, 77 being opened by a switching pulse on a lead 34, derived from time distributor 29.

Whereas in said patent specification, in the single sideband receivers described there, equalization takes place after single-sideband demodulation in a single-sideband demodulator formed by a frequency transposition stage, the present invention gives a new concept of such a device which has considerable advantages, especially as to the digital construction for integration in a semiconductor body, and in which a considerable simplification is coupled with an optimum transmission quality.

According to the invention, equalizer 32 jointly with a single-sideband frequency transposition device 300 constituting a unit, is provided with a second series of output channels 337 having an output formed by a second combination device 345, which series of output channels 337 is connected to the various sub-bandpass filters 38–40, 47 and additional sub-bandpass filters 38'–40', 47' different output channels 337 incorporating a phase and amplitude control circuit 341, 42 which is crosswise connected to the comparators 43 of the control voltage generator to obtain an output signal from the second combination device 345 which is shifted in phase over $\pi/2$ with respect to the output signal of the first combination device 45, these combination devices 345, 45 supplying a first and a second input signal for said single-sideband frequency transposition device 300 having a first modulator stage 301 and a second modulator stage 302, which are also fed by transposition oscillations which are mutually shifted in phase over $\pi/2$, and which are derived from a common transposition generator, the output signal of the unit constituted by equalizer 32 and single-sideband frequency transposition device 300 being derived from a combination device 303 connected to the input of the two modulator stages 301, 302.

In the embodiment shown the phase and amplitude control circuits 341, 42 of this second series of output channels 337 are constructed in exactly the same manner as those of the first series of output channels 37. The two series of output channels 337, 37 have the amplitude control circuits 42 in common, whilst the phase control circuits 341, 41 with proportional amplifiers 358, 359; 58, 59 are separated. In the second series of output channels 337 the amplifiers 358, 359 are not connected to the comparator 43 in the same manner as the amplifiers 58, 59 in the first series of output channels 37, but crosswise, i.e. the connections to smoothing filters 60, 61 of phase detectors 62, 63 have been interchanged. Furthermore, the outputs of these amplifiers 358, 359 are connected to a combination device 364 in the form of a subtracting stage, and the common transposition generator of frequency transposition device 300 acting as a single-sideband demodulator is formed by the carrier generator included in central frequency generator 19, which carrier generator is connected via time distributor 29 and carrier lead 30 on the one hand direct to modulator stage 302 and on the other hand to modulator stage 301 via a $\pi/2$ phase shifting network 304.

In the described system equalization of the received signal, modulated on the carrier wave, is effected direct without prior demodulation, and the same applies to the adjustment of equalizer 32. To that end the local test pulse pattern generator in local reference source 44 is provided with a modulator stage 305 connected to carrier lead 30, the frequency components of the carrier pulses produced in modulator stage 305 and selected in selection filter 49 being supplied to comparator 43 as phase reference for the frequency components of the received, carrier-modulated adjusting signal, which components are selected in sub-bandpass filters 38–40, 47 and 38'–40', 47', respectively. If, for example, the angular frequency of the carrier is given by $\omega_0$ and the component of the modulating pulse spectrum belonging to output channel $m$ by $p_m$, then the following equation applies for the adjusting signal as well as for the corresponding reference signal of the mentioned output channel $m$:

$$\omega_m = \omega_0 - p_m$$

To illustrate the described frequency relation FIG. 2 shows a frequency diagram in which the curves K show the amplitude - versus - frequency characteristics of the sub-bandpass filters having pass regions of, for example, 200 Hz and the arrows show the frequency components of the adjusting signals modulated on the carrier, the carrier being designated by $\omega_0$.

Thus, at the output of single-sideband demodulator 300 after equalizer 32 which is formed by combination device 303, the demodulated signals are obtained which have been equalized accurately as to phase and amplitude, as will now be explained in further detail.

If to this end the adjusting signal, modulated on the carrier wave, is supplied to equalizer 32 and if the notation already used is also used here, then the non-equalized output signals $a_m \cos(\omega_m t + \phi_m)$ and $a_m \sin(\omega_m t + \phi_m)$ will be produced at the outputs of sub-bandpass filters 38–40, 47 and 38'–40', 47' in the $m^{th}$ output channel 37 and 337, respectively. The signals $\sqrt{b_m} \cos(\omega_m t + \phi_m)$ and $\sqrt{b_m} \sin(\omega_m t + \phi_m)$ are then derived from control amplifiers 78, 79 in amplitude control circuit 42 and the control signals $\sqrt{b_m} \cos \phi_m$ and $\sqrt{b_m} \sin \phi_m$ are derived from phase detectors 62, 63. These signals, derived from amplitude control circuit 42 and from phase detectors 62, 63, are supplied to the proportional amplifiers 58, 59 and 358, 359 in phase control circuits 41 and 341 of both series of output channels 37 and 337, respectively. Thus the equalized output signal $b_m \cos \omega_m t$ already mentioned will be produced at the output of combination device 64 in phase control circuit 41 belonging to the first series of output channels 37. Likewise, at the output of subtraction stage 364 in the phase control circuit 341 belonging to the second series of output channels 337, the following output signal will be produced as a result of the crosswise connection to the outputs of phase detectors 62, 63:

$$\sqrt{b_m} \sin(\omega_m t + \phi_m) \times \sqrt{b_m} \cos \phi_m - \sqrt{b_m} \cos(\omega_m t + \phi_m) \times \sqrt{b_m} \sin \phi_m = b_m \sin \omega_m t$$

Consequently the system described shows the surprising property that besides the first equalized output signal $b_m \cos \omega_m t$ a second equalized output signal $b_m \sin \omega_m t$, shifted in phase over $\pi/2$ with respect to the first one, is produced, the two equalized output signals enabling the application of the shown single-sideband demodulator 300 with two modulator stages 301, 302. To that end the two equalized signals $b_m \cos \omega_m t$ and $b_m \sin \omega_m t$ are in particular supplied as input signals to the modulator stages 302, 301 via the combination devices 45, 345 for single-sideband demodulation.

Simultaneously with the input signals $b_m \cos \omega_m t$ and $b_m \sin \omega_m t$ also the carrier signals $\cos \omega_0 t$ and $\sin \omega_0 t$ are supplied to the modulator stages 302, 301 via carrier lead 30. Consequently, at the combination device 303, after entering the equation for $\omega_m = \omega_0 - p_m$ given above, the signals:

$$b_m \cos(\omega_0 - p_m)t \times \cos \omega_0 t + b_m \sin(\omega_0 - p_m)t \times \sin \omega_0 t = b_m \cos p_m t$$

will be produced.

This formula represents the demodulated subsignal of the $m^{th}$ output channel 37, 337 which has been accurately equalized as to phase and amplitude. In the same manner, by single-sideband demodulation, while preventing undesired modulation products, also the demodulated and accurately equalized sub-band signals of the remaining output channels 37, 337 are obtained.

While utilizing the additional phase control circuits 341 which, however, are identical of construction for all output channels 337, but without utilizing a wideband 90° phase shifting network, both an optimum demodulation quality and the saving of an output filter as well as an input filter is realized in the system according to the invention, since the function of input filter is already fulfilled by equalizer 32 as shown by the frequency diagram in FIG. 2. Especially for the construction in digital techniques the saving of the said networks is particularly important as these networks, besides an analog-to-digital converter also require a shift register with a matrix of weighting networks connected thereto. Furthermore, it has been found that in a digital implementation further simplifications in the construction are realized when the measures according to the invention are applied, as will now be explained with reference to FIG. 3. Elements corresponding to FIG. 1 are given the same reference numerals.

In this embodiment a shift register 91 for binary pulse signals is used as delay circuit in the frequency-analyzer 35, which shift register is provided with shift register elements coupled in like manner as in FIG. 1 with weighting networks 38–40, 38'–40', which weighting networks 38–40, 38'–40' are connected to a combination network 47, 47'.

Preceding the shift register 91, an analog-to-digital converter 92 in the form of a delta modulator is included. This delta modulator is composed in known manner of a difference producer 93, a pulse modulator 95 connected to a pulse generator 94 and a subsequent pulse regenerator 96 connected to difference producer 93 via a feedback circuit which includes a digital-to-analog converter 98 in the form of an integrating network. In delta modulator 92 the pulses of pulse generator 94 having a pulse frequency of, for example, 48 kHz are either passed or suppressed by pulse modulator 95, depending on the polarity of the difference signal produced in difference producer 93. The pulse train formed in this manner with an alternation of present and absent pulses which is characterized by the received analog signals, is supplied for sub-band selection to shift register 91 via a pulse widener 97, for which shift register 91 the shift pulses are supplied by pulse generator 94 also acting as shift pulse generator.

To realize the desired filter characteristics $H(\omega)$; $H'(\omega)$ of the sub-bandpass filter 38–40, 47; 38'–40', 47' the weighting networks 38–40, 38'–40' included therein are dimensioned in a suitable manner, since the filter characteristics to be realised are fully determined by this dimensioning of the weighting networks 38–40, 38'–40', as is explained in more detail in said patent specification. In the described embodiment the amplitude-versus-frequency characteristics have — for example — the form shown in the frequency diagram of FIG. 2.

As is the case for the system in FIG. 1, in both series of output channels 37 and 337 the subbands selected in sub-band pass filters 38–40, 47 and 38'–40', 47' are supplied for amplitude control to common amplitude control circuit 42 with control amplifiers 78, 79 and for phase control to the subsequent, separated phase control circuits 41, 341, the phase control being effected in dependence on the produced output voltages of phase detectors 62, 63 which are connected, direct and crosswise respectively, to the separated phase control circuits 41, 341. The amplitude control is effected by squaring the smoothed output voltages of phase detectors 62, 63, followed by combining the squared voltages in combination device 70 and by amplitude comparison of the voltage thus obtained in amplitude comparator 80, which amplitude comparison stage 80 is connected to common amplitude control circuit 42 via storage network 74 and a feedback lead.

To obtain an embodiment which is suitable for application of digital techniques the output voltages of phase detectors 62, 63 are not immediately used but they are first converted to duration-modulated pulses in pulse duration modulation 100, 101. For the proportional amplifiers in the separated phase control circuits 41, 341 of the two series of output channels 37, 337, this enables the use of normally blocked electronic switches 102, 103; 402, 403 as amplitude controllers which are released each time an output pulse of pulse duration modulators 100, 101 is fed to them. In the embodiment shown, pulse duration modulators 100, 101 are constructed as slicers, to which, besides the smoothed output voltages of phase detectors 62, 63 also an auxiliary sawtooth signal (having a repetition frequency of, for example, 50 kHz) is supplied which is derived from a sawtooth generator 104 common to all comparator 43.

So at the outputs of electronic switches 102, 103; 402, 403 of the separated phase control circuits 41, 341 pulses are produced which are modulated in duration and which also vary in amplitude with the output voltages of control amplifiers 78, 79 in common amplitude control circuit 42. After combining in combination devices 64, 364 these signals are supplied via combination devices 45, 345 to demodulators 105, 405 in the form of low-pass filters, which are common for all output channels 37, 337. As a result of the high repetition frequency (50 kHz) of the auxiliary signal the low-pass filters 105, 405 used as demodulators are particularly simple and, in the practical realization they can be united with the combination devices 64, 45 and 364, 345 respectively, to a single very simple network.

Just as in FIG. 1, by means of proportional amplifiers 48, 59; 358, 359 in separated phase control circuits 41, 341, so in FIG. 3 the product of the smoothed phase control signal of phase detectors 62, 63 and the relevant output signal of control amplifiers 78, 79 is obtained in common amplitude control circuit 42 by means of electronic switches 102, 103; 402, 403 and subsequent demodulators 105, 405. After demodulation of the pulses of electronic switches 102, 103; 402, 403 (which pulses are modulated both in duration and in amplitude) the product of the two modulation signals formed by the smoothed phase control signal and the output signal of control amplifiers 78, 79 is indeed produced as demodulation signal.

In exactly the same way the combined pulse duration and pulse amplitude modulation is used to realize, for digital techniques, a particularly favourable embodiment of the squaring stages for the smoothed phase control signals in comparator 43 by using the smoothed phase control signal as modulation signal both for the pulse duration modulation and for the pulse amplitude modulation. To that end a normally blocked electronic switch 106, 107 is connected to smoothing filters 60, 61 of phase detectors 62, 63 which electronic switch is also controlled by pulse duration modulator 100, 101, the demodulator being formed by storage network 74 which is already present at the output of comparator 43.

In like manner as for the system in FIG. 1 the two equalized sub-band signals $b_m \cos \omega_m t$ and $b_m \sin \omega_m t$ are produced at the outputs of common demodulators 105, 405 for the $m^{th}$ output channels 37, 337 and, by combining these signals with the sub-band signals of the remaining output channels 37, 337 in combination devices 45, 345 the two input signals for modulator stages 301, 302 of single-sideband demodulator 300 are produced. At the output of combination device 303, by single sideband demodulation, the demodulated and equalized pulse signals are produced again which after pulse regeneration in pulse regenerator 18 are passed on to signal sink 17 for further processing. During the information pulse transmission also here the proper adjustment of the system is maintained by means of electronic switches 75, 76, 77 which are opened after the adjusting period by a switching pulse on lead 34.

By applying the measures according to the invention a junction of equalization system and single-sideband demodulation system has been realised which is particularly interesting as regards the digital construction for integration in a semiconductor body. Besides the savings already mentioned above of, for digital techniques, complex networks such as wide-band phase shifter, input filter and output filter, the further advantage is obtained here that also the additional phase control circuit 341 for the second series of output channels 337 need only be constructed as electronic switches which are very simple circuit elements in digital techniques. In all respects, a system has been realized here which is particularly attractive for integration in a semiconductor body.

The described system is not restricted to applications for single-sideband demodulation purposes only, but by a suitable choice of the frequency of the common transposition oscillator it may also be used for frequency transposition to a frequency band differing from the demodulation band. The described system may also be used with advantage for single-sideband transmission with fully suppressed second sideband, in which case central frequency generator 19 can be considerably simplified by making the frequency of one of the pilot signals equal to the carrier frequency and the frequency difference between the pilot signals equal to the clock frequency.

Furthermore, within the framework of the invention other embodiments than those described are possible such as embodiments suitable for adaptive equalization, embodiments having a deviating structure of the output channels and embodiments using, instead of delta modulation, another type of pulse code modulation, all this, for example, in the manner already described in said patent specification.

What is claimed is:

1. A system for equalization of the transmission characteristic formed by the amplitude-versus-frequency characteristic and the phase-versus-frequency characteristic of the transmission band associated with a transmission path and allotted to the transmission of information signals, the following measures being used in combination in this system:
    a. a frequency-analyzer for splitting the transmission band into a number of frequency sub-bands, comprising a delay circuit and a plurality of parallel-arranged output channels each incorporating a sub-bandpass filter and an additional sub-bandpass filter having the same passbands but having at least over the passband a mutual phase shift of $\pi/2$, said sub-bandpass filters being formed by connecting each of the output channels via a plurality of weighting networks to points having a different time delay in the delay circuit, the frequency-split frequency sub-bands being derived from the parallel-arranged output channels;

b. the sub-band filters in the output channels of the frequency-analyzer for the frequency components of the information signal jointly forming an uninterrupted pass region without reject areas;

c. different output channels of the frequency-analyzer incorporating a phase and amplitude control circuit which are controlled by a control voltage;

d. a control voltage generator for generating the control voltages for controlling the phase and amplitude control circuits incorporated in the output channels of the frequency-analyzer, which control voltage generator comprises a plurality of comparators fed by at least a spectrum component of a received adjusting signal which is split-up into its frequency components in the frequency-analyzer, which control voltage generator also comprises a local reference source for the phase and amplitude reference of the adjusting signal split-up into its different frequency components, the control voltage for the different phase and amplitude control circuits being derived from the output of the comparators;

e. an output circuit formed by a first combination device connected to the phase and amplitude control circuits in the output channels of the frequency-analyzer, characterized in that an equalizer jointly with a single-sideband frequency transposition device constituting a unit, is provided with a second series of output channels connected to the various sub-bandpass filters and additional sub-bandpass filters, said second series of output channels having an output formed by a second combination device, different output channels of said second series incorporating a phase and amplitude control circuit which is cross-wise connected to the comparators of the control voltage generator to obtain an output signal from the second combination device which is shifted in phase over $\pi/2$ with respect to the output signal of the first combination device, these combination devices supplying a first and a second input signal for said single-sideband frequency transposition device having a first and second modulator stage, which are also fed by transposition oscillations which are mutually shifted in phase over $\pi/2$ and which are derived from a common transposition generator, the output signal of the unit constituted by said equalizer and single-sideband frequency transposition devices being derived from a combination device connected to the output of the two modulator stages.

2. A system as claimed in claim 1, characterized in that corresponding output channels of the first and second series comprise separated phase control circuits, which are each provided with an amplitude controller connected to a sub-bandpass filter and an amplitude controller connected to an additional sub-bandpass filter, the comparator of the control voltage generator incorporating a phase detector connected to the sub-bandpass filter and a phase detector connected to the additional sub-bandpass filter, which phase detectors directly supply the control voltage for the amplitude controllers in the phase control circuit of the output channels of the first series and, after interchanging the outputs, that for the amplitude controllers in the second series.

3. A system as claimed in claim 2, characterized in that combination devices are connected to the outputs of the amplitude controllers in the phase control circuits of the output channels, which combination devices are formed by an adder stage and a subtraction stage for the output channels of the first series and of the second series respectively.

4. A system as claimed in claim 2, characterized in that the amplitude controllers of the phase control circuits included in the output channels of the first and second series are provided with electronic switches, which are controlled by output pulses of pulse duration modulators coupled to the outputs of the phase detectors.

5. A system as claimed in claim 2, characterized in that, in cascade with the separate phase control circuits, an amplitude control circuit is included which is common for corresponding output channels of the first and of the second series.

6. A system as claimed in claim 1 characterized in that the frequency-analyzer acting simultaneously as input filter comprises a delay circuit in the form of a shift register and, preceding the shift register, an analog-to-digital converter for the received signals.

7. A system as claimed in claim 6, characterized in that the analog-to-digital converter is formed by a delta modulator.

8. A system as claimed in claim 1, in which the received adjusting signal is formed by a periodic test pulse pattern, characterized in that the local reference source comprises a pulse generator synchronized by the locally generated clock frequency and feeding a subsequent carrier modulator which is also fed by a locally generated carrier oscillation.

* * * * *